(12) United States Patent
Kawazu et al.

(10) Patent No.: US 11,630,017 B2
(45) Date of Patent: Apr. 18, 2023

(54) PRESSURE SENSOR HOUSING AND PRESSURE SENSOR BEING DISPOSED INSIDE A HEATER BLOCK

(71) Applicant: Azbil Corporation, Tokyo (JP)

(72) Inventors: Takayoshi Kawazu, Tokyo (JP); Raita Mori, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 120 days.

(21) Appl. No.: 17/216,206

(22) Filed: Mar. 29, 2021

(65) Prior Publication Data
US 2021/0310889 A1  Oct. 7, 2021

(30) Foreign Application Priority Data
Apr. 1, 2020 (JP) .............................. JP2020-065784

(51) Int. Cl.
*G01L 19/14* (2006.01)
*G01L 9/00* (2006.01)

(52) U.S. Cl.
CPC ............ *G01L 19/14* (2013.01); *G01L 9/0072* (2013.01)

(58) Field of Classification Search
None
See application file for complete search history.

(56) References Cited

U.S. PATENT DOCUMENTS 10,041,852 B2    8/2018  Panhoelzl et al.
11,112,326 B2 *  9/2021  Kreis ..................... F16J 15/062

(Continued)

FOREIGN PATENT DOCUMENTS

CN     107209073 A    9/2017
JP     2015-068738 A  4/2015

(Continued)

OTHER PUBLICATIONS

Korean Intellectual Property Office, "Request for the Submission of an Opinion," issued in Korean Patenl Application No. 10-2021-0037216, which is a Korean counterpart of U.S. Appl. No. 17/216,206, dispatched on Apr. 22, 2022, 8 pages (4 pages of English translation of Request for the Submission of an Opinion, and 4 pages of the original Request for the Submission of an Opinion).

(Continued)

*Primary Examiner* — Octavia Davis Hollington
*Assistant Examiner* — Jermaine L Jenkins (57) ABSTRACT

To provide a pressure sensor housing that is less likely to cause temperature distribution inside a pressure sensor when the pressure sensor is disposed inside a heater block, a pressure sensor housing includes a hollow cylindrical member extending along a predetermined axis core. A pressure sensor element that detects the pressure of a fluid is accommodated inside the cylindrical member. The entire circumference of a side surface thereof is surrounded by an air layer in the first posture in which an axis core of a space is aligned with the predetermined axis core with the hollow member disposed in the space. The side surface is in contact with a wall surface defining the space at a plurality of points at the same time in a second posture, which is at least one of postures in which the predetermined axis core is eccentric with the axis core of the space.

14 Claims, 8 Drawing Sheets

(56) References Cited

U.S. PATENT DOCUMENTS

2015/0040674 A1* 2/2015 Ishihara .............. G01L 19/0636
                                                    73/724
2018/0238749 A1   8/2018 Doko et al.
2021/0255048 A1*  8/2021 Niimura ................ G01L 9/0047

FOREIGN PATENT DOCUMENTS

| JP | 2018-004639 A | 1/2018 |
| JP | 2018-205259 A | 12/2018 |

OTHER PUBLICATIONS

China National Intellectual Property Administration, "First Office Action", issued in Chinese Patent Application No. 202110318131.4, which is a counterpart to U.S. Appl. No. 17/216,206, dated Oct. 31, 2022, 13 pages (6 pages of English translation of Office Action, and 7 pages of original Office Action).

* cited by examiner

PRESSURE SENSOR HOUSING AND PRESSURE SENSOR BEING DISPOSED INSIDE A HEATER BLOCK

CROSS REFERENCE TO RELATED APPLICATIONS

This patent application claims the benefit of foreign priority to Japanese Patent Application No. JP 2020-065784 filed on Apr. 1, 2020, the disclosure of which is hereby incorporated by reference in its entirety.

BACKGROUND OF THE INVENTION

The present disclosure relates to a housing used for a pressure sensor that detects the pressure of a fluid or the like, and a pressure sensor having this housing.

A pressure sensor with a diaphragm is widely used as a sensor for measuring the pressure of a fluid. The pressure sensor measures the pressure of the fluid (referred to below as the "measurement target fluid") to be measured by obtaining a change in the pressure of the measurement target fluid as a mechanical displacement through the diaphragm and detecting this mechanical displacement as an electric signal. For example, in a capacitive pressure sensor element and a pressure sensor with the capacitive pressure sensor element, the deformation of a diaphragm is detected as a change in the capacitance between a pair of electrodes, and the pressure of the measurement target fluid is measured based on this change in capacitance. The diaphragm is disposed so as to face two spaces isolated from each other in a non-communication state, and the displacement is caused due to a pressure difference caused when the measurement target fluid flows in or from one of these two spaces.

In the pressure sensor element with the above structure and the pressure sensor with the pressure sensor element, the pressure receiving surface of the diaphragm that receives the pressure of the measurement target fluid makes contact with the measurement target fluid. Accordingly, when the pressure sensor element and the pressure sensor with the pressure sensor element are used as a vacuum gauge in the film forming and etching process of an apparatus for manufacturing semiconductor devices or the like, the film-forming substance contained in the measurement target fluid is expected to adhere to the pressure receiving surface of the diaphragm. This film-forming substance generates a film with a continuous chemical reaction and adheres to the pressure receiving surface of the diaphragm with a relatively strong force. In the film-forming process with such a chemical reaction, a force acting between molecules or crystal lattices, a so-called film internal stress, is generated. This internal stress strongly acts on the diaphragm to which the substance adheres, deforms the diaphragm, and shifts the zero point of the sensor output, thereby causing reduction in measurement accuracy. Accordingly, to prevent the film-forming substance from being deposited on the diaphragm, a heater is provided so as to surround the outer circumferential surface of the housing and heat the inside of the housing, whereby the ambient temperature of the diaphragm is kept at a high temperature at which the film-forming substance is prevented from precipitating (see, for example, patent literature 1).

CITATION LIST

Patent Literature

[PTL 1] JP-A-2018-205259

BRIEF SUMMARY OF THE INVENTION

In the conventional pressure sensor such as the pressure sensor described in patent literature 1, the pressure sensor is inserted into a heater block with a cylindrical inner space. At this time, an air layer is formed between the inner circumferential side wall surface of the heater block and the pressure sensor, more specifically, between the inner circumferential side wall surface of the heater block and the side wall surface of the housing of the pressure sensor (that is, an air layer is formed so as to surround the housing), and the air in the air layer is heated by the heater, whereby the inside of the housing is heated at a uniform temperature. However, if the design, manufacture, or installation of the heater block is not appropriate, for example, if the dimensions and the like are designed so that the inner space of the heater block does not fit the size of the pressure sensor disposed therein, if a distorted inner space is formed because the machining accuracy of the heater block is improper, or if the pressure sensor to be disposed inside is not located in the center of the inner space because the installation of the heater block is improper, then the inner circumferential surface of the heater block may partially make contact with the housing of the pressure sensor.

Figure 12:
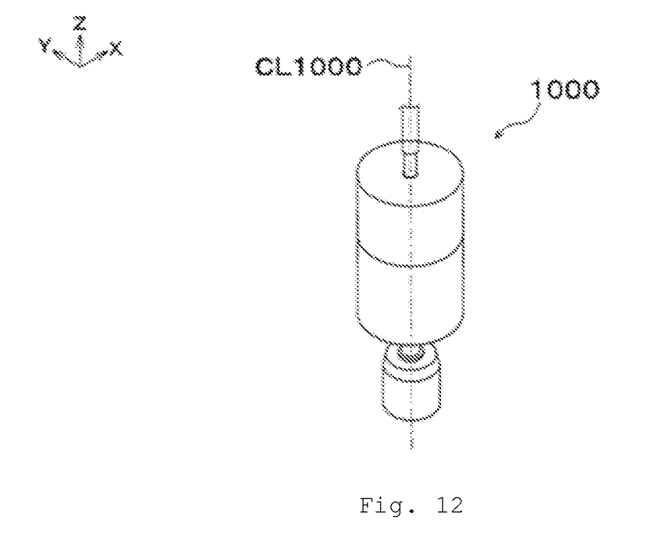
FIG. 12 is a perspective view illustrating a conventional pressure sensor when viewed from diagonally above.
Figure 13A:
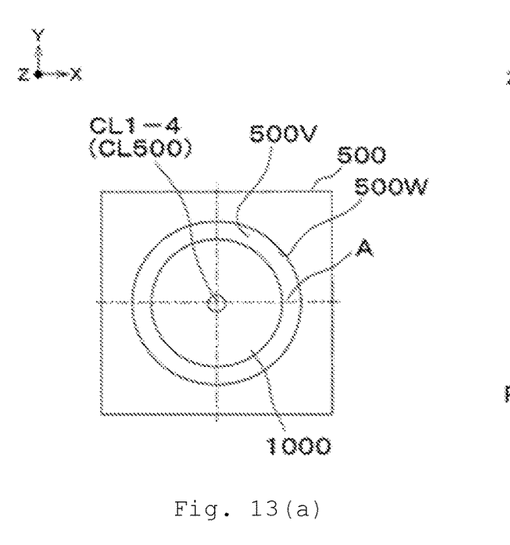

In such a situation, heat is transferred to a part of the housing without intervention of the air layer (heat is transferred to the pressure sensor by heat conduction between solids) and the air layer becomes locally thin, whereby turbulence (unevenness) occurs in the heat flux. This event causes temperature distribution (temperature variations in various places) inside the pressure sensor, that is, inside the housing and in the pressure sensor element accommodated therein. In particular, in a conventional pressure sensor 1000 with the cylindrical housing illustrated in FIG. 12, the region (region indicated by S1000 near the contact position P1000 in FIG. 13) in which the air layer becomes thin is widely formed near the contact portion in contact with the inner circumferential side wall of the heater block as illustrated in FIG. 13, turbulence (unevenness) of the heat flux appears remarkably, and the above temperature distribution is likely to occur.

Here, the pressure sensor used as a vacuum gauge is shipped after being calibrated in the state in which the entire product is heat-equalized to ensure the specified measurement accuracy. Accordingly, the above temperature distribution causes a deviation (for example, a zero point shift) in the correlation between the output value (the value of an electric signal output from the pressure sensor element) and the input value (that is, the pressure value of the measurement target fluid) based on the calibration, thereby bringing about a measurement error.

The present disclosure addresses the above problems with an object of providing a housing that prevents temperature distribution from being generated inside a pressure sensor when the pressure sensor is disposed inside a heater block and used, and providing a pressure sensor in which measurement error is suppressed by adopting the housing.

According to the present disclosure, a pressure sensor housing (100) for solving the above problems includes a hollow member including a cylindrical side surface (100SW) extending along a predetermined axis core (CL1), an upper surface (102) connected to the side surface (100SW), and a lower surface (101) connected to the side surface (100SW), in which a pressure sensor element (11) is accommodated inside the hollow member, the pressure sensor element detecting a pressure of a fluid, and an entire circumference of the side surface is surrounded by an air layer (A) in a first posture in which an axis core (CL500) of a cylindrical space (500V) is aligned with the predetermined axis core with the hollow member disposed in the cylindrical space and the side surface is in contact with a wall surface (500W) defining the cylindrical space at a plurality of points (P1 and P2) at the same time in a second posture, the second posture being at least one of postures in which the predetermined axis core is eccentric with the axis core of the cylindrical space.

In addition, in the pressure sensor housing, at least a part of the side surface may be formed so that a shape formed by an intersection line between the side surface and a plane orthogonal to the predetermined axis core is a polygon.

In addition, in the pressure sensor housing, the side surface may be formed by connecting three or more planes parallel to the predetermined axis core.

In addition, in the pressure sensor housing, the polygon may be an octagon.

In addition, in the pressure sensor housing, at least a part of the side surface may be formed so that a shape formed by an intersection line between the side surface and a plane orthogonal to the predetermined axis core is a shape obtained by connecting three or more different curved lines, and at least one of a curvature and a curvature center is different among the different curved lines.

In addition, in the pressure sensor housing, the side surface may be a part of a cylindrical surface that extends in parallel to the predetermined axis core and is recessed toward the predetermined axis core.

In addition, in the pressure sensor housing, a convex portion may be provided on the side surface.

In addition, to solve the above problems, the pressure sensor according to the present disclosure includes the pressure sensor housing.

It should be noted here that reference numerals in the drawings that correspond to components of the present disclosure are enclosed in parentheses in the above description.

In the pressure sensor according to the present disclosure, it is possible to provide a housing in which temperature distribution is unlikely to be generated inside the pressure sensor when the pressure sensor is disposed inside the heater block and used, and to provide a pressure sensor with this housing in which measurement error is suppressed.

BRIEF DESCRIPTION OF THE SEVERAL VIEWS OF THE DRAWING

FIG. 1(*a*) is a perspective view illustrating a pressure sensor with a housing according to an embodiment of the present disclosure when viewed from diagonally above, and FIG. 1(*b*) is a perspective view illustrating the pressure sensor with the housing according to the embodiment of the present disclosure when viewed from diagonally below.

FIG. 2(*a*) is an exploded perspective view illustrating the pressure sensor with the housing according to the embodiment of the present disclosure when viewed from diagonally above, and FIG. 2(*b*) is an exploded perspective view illustrating the pressure sensor with the housing according to the embodiment of the present disclosure when viewed from diagonally below.

FIGS. 5(*a*) and 5(*b*) are plan views illustrating the pressure sensor with housing according to the embodiment of the present disclosure disposed inside the heater block.

FIGS. 7(*a*) and 7(*b*) are plan views illustrating the pressure sensor with a housing (modification 1) according to the embodiment of the present disclosure disposed inside the heater block.

FIGS. 9(*a*) and 9(*b*) are plan views illustrating the pressure sensor with the housing (modification 2) according to the embodiment of the present disclosure disposed inside the heater block.

FIGS. 11(*a*) and 11(*b*) are plan views illustrating the pressure sensor with the housing (modification 3) according to the embodiment of the present disclosure disposed inside the heater block.

FIGS. 13(*a*) and 13(*b*) are plan views illustrating the conventional pressure sensor disposed inside the heater block.

DETAILED DESCRIPTION OF THE INVENTION

A housing 100, which is a preferable embodiment of the present disclosure, and a pressure sensor 1 with the housing 100 will be described with reference to FIGS. 1 to 11. Here, the pressure sensor 1 is used as a pressure gauge with a capacitive pressure sensor element and configured as a so-called separate pressure sensor (separate vacuum sensor) that externally has an amplifier that amplifies an electric signal from the pressure sensor element.

It should be noted here that front and rear in the description are defined as ±X (the +X direction is the rear direction and the −X direction is the front direction), left and right are defined as ±Y (the +Y direction is the left direction and the −Y direction is the right direction), and up and down are defined as ±Z (the +Z direction is the up direction and the −Z direction is the down direction) on the coordinate axes illustrated in the drawings. In addition, the diagrams are conceptual views and the contents illustrated therein do not necessarily match the actual housing and the pressure sensor with the actual housing.

Figure 1:
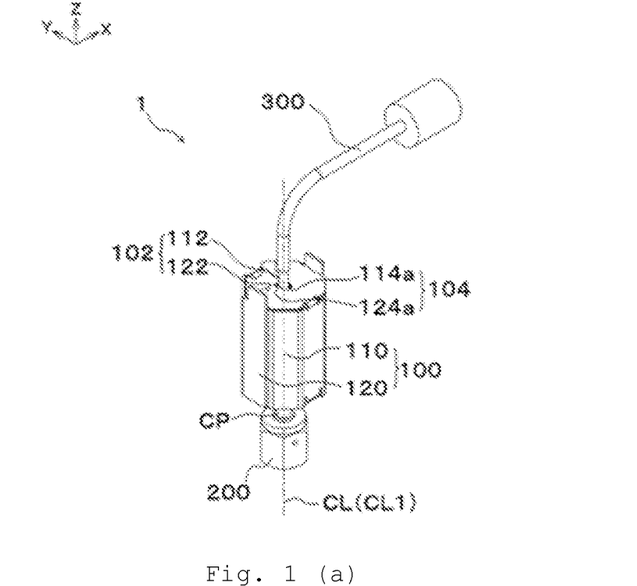
Figure 2:
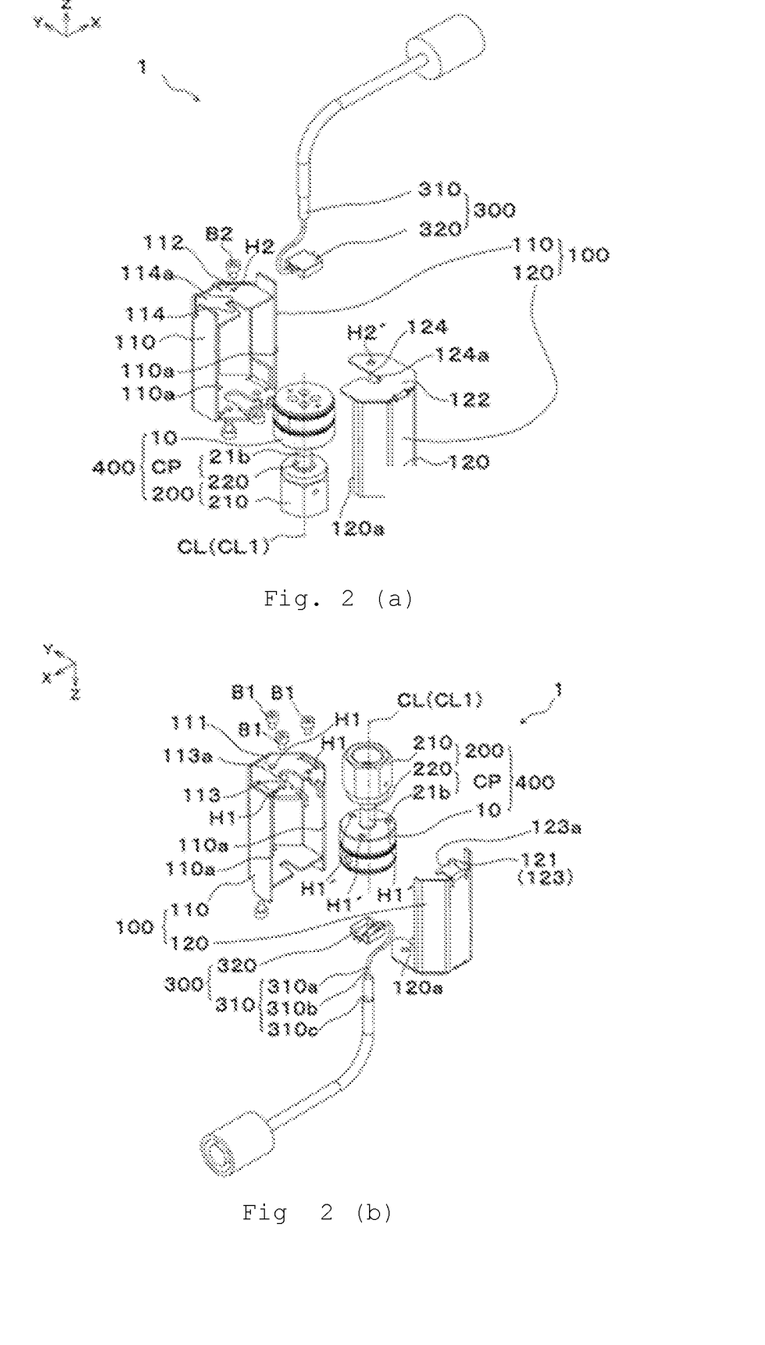

As illustrated in the perspective views in FIGS. 1(*a*) and 1(*b*) and the exploded perspective views in FIGS. 2(*a*) and 2(*b*), the pressure sensor 1 mainly includes a sensor unit 10, the housing 100, which accommodates this sensor unit 10 therein, a coupling 200, which is a mechanical element connected to pipes from and to which a measurement target fluid flows, and a cable 300, which sends an electric signal output from the sensor unit 10 to the outside.

[Sensor Unit 10]

Figure 3:
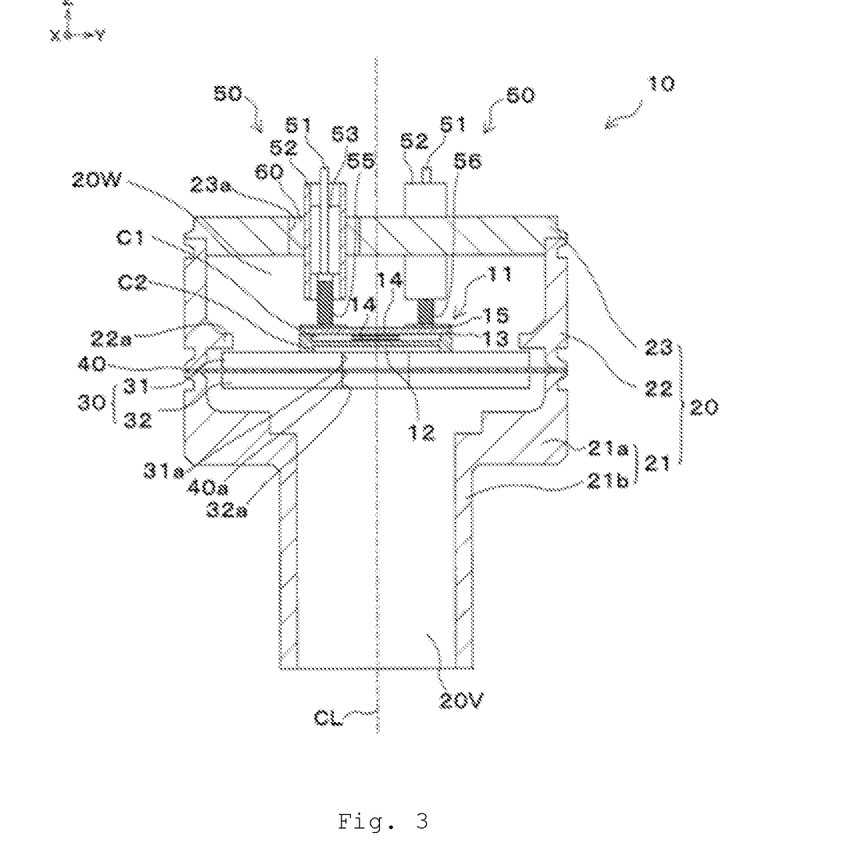
FIG. 3 is a sectional view illustrating a sensor unit included in the pressure sensor according to the embodiment of the present disclosure.

As illustrated in FIG. 3, the sensor unit 10 mainly includes a pressure sensor element 11, a casing 20, a base plate 30 accommodated in the casing 20, a support diaphragm 40 joined to the base plate 30 and bridged over the casing 20, and electrode lead portions 50, which conductively connect the inside and the outside of the casing 20.

[Pressure Sensor Element 11]

The pressure sensor element 11 is an element that obtains a change in the pressure of the measurement target fluid as a mechanical displacement and further detects the mechanical displacement as an electric signal (for example, a voltage signal), and configured as, for example, a capacitive pressure sensor element as described above. This pressure sensor element 11 is, for example, a substantially 1-cm square thin plate in plan view and includes a diaphragm 12 like a thin plate, a discoid base 13, which is connected to the diaphragm 12 and forms a capacitance chamber C1, a pair of sensor electrode portions 14 and 14 accommodated inside the capacitance chamber C1, and a contact pad 15 electrically connected to electrode lead pins 51 described later.

The diaphragm 12 is deformed so that the central portion thereof is bent, for example, upward (+Z direction) in FIG. 3 when the measurement target fluid having flowed into an introduction portion 20V makes contact with one surface (pressure receiving surface) thereof. This deformation of the diaphragm 12 changes the distance between the pair of sensor electrode portions 14 and 14 disposed in the capacitance chamber C1, thereby changing the capacitance between these electrodes according to the amount of deformation. In this way, the pressure sensor element 11 detects changes in the pressure of the measurement target fluid as changes in the capacitance.

[Casing 20]

The casing 20 forms the outer frame of the sensor unit 10, supports the pressure sensor element 11 via the base plate 30 and the support diaphragm 40 described later, defines the introduction portion 20V from and to which the measurement target fluid flows, and forms a portion to be connected to the coupling 200. The casing 20 includes a lower housing 21, an upper housing 22, and a cover 23, and these casing elements are made of, for example, Inconel, which is a corrosion-resistant metal. The lower housing 21, the upper housing 22, and the cover 23 are configured so as to be stacked from the bottom to the top in this order along, for example, an axis core CL (axis core of the pipe from and to which the measurement target fluid flows) of the coupling 200 described later, and the mating surfaces thereof are formed on, for example, the plane (XY plane) orthogonal to the axis core CL (which is the same as the axis core of the pipe from and to which the measurement target fluid flows and corresponds to the Z axis) of the coupling 200 described later, and the portions facing each other are joined by, for example, welding.

The lower housing 21 is a cylindrical portion that includes a large-diameter cylindrical portion 21a with a large diameter and a small-diameter cylindrical portion 21b with a small diameter concentrically connected to each other. The lower opening end of the upper housing 22 is connected to the upper opening end of the large-diameter cylindrical portion 21a via the support diaphragm 40. In addition, the inner circumferential wall of the small-diameter cylindrical portion 21b defines the introduction portion 20V to which the measurement target fluid flows. The small-diameter cylindrical portion 21b forms a portion to be joined to a coupling junction portion 220 of the coupling 200 described later by, for example, welding.

The upper housing 22 is a substantially cylindrical portion that intervenes between the lower housing 21 and the cover 23, and the lower opening end thereof is connected to the upper opening end of the lower housing 21 via the support diaphragm 40, and the upper opening end thereof is connected to the cover 23 as described above. The diameters (inner diameter and outer diameter) of the upper housing 22 are substantially the same as the diameters (inner diameter and outer diameter) of the large-diameter cylindrical portion 21a of the lower housing 21, and the axis core of the upper housing 22 is aligned with the axis core of the lower housing 21. In addition, the upper housing 22 defines an independent vacuum reference vacuum chamber 20W in the casing 20 together with the cover 23, the support diaphragm 40, the base plate 30, and the pressure sensor element 11. It should be noted here that the reference vacuum chamber 20W is filled with a gas adsorbing substance referred to as a so-called getter (not illustrated) to maintain a desired degree of vacuum. In addition, a stopper 22a projects at an appropriate position on the inner circumferential side wall surface near the lower opening end. The stopper 22a regulates the excessive displacement of the base plate 30 due to a sudden increase in the pressure of the measurement target fluid.

The cover 23 includes a substantially discoid plate, and an electrode lead insertion hole 23a is formed at a predetermined position. A predetermined electrical sealing property is ensured by embedding the electrode lead portion 50 in the electrode lead insertion hole 23a via a hermetic seal 60.

As described above, the casing 20 has an outer shape formed by stacking the lower housing 21, the upper housing 22, and the cover 23 along the axis core CL and connecting two cylinders having the axis core CL and different diameters to each other.

[Base Plate 30]

The base plate 30 is a component that supports the pressure sensor element 11 and includes a first base plate and a second base plate 32. The base plate 30 is supported so as to be bridged over the casing 20 through the support diaphragm 40 described later.

The first base plate 31 and the second base plate 32 are made of, for example, sapphire that is a single crystal of aluminum oxide. Both the first base plate 31 and the second base plate 32 are located away from the inner surface of the casing 20. The first base plate 31 is joined to the upper surface of the support diaphragm 40 and the second base plate 32 is joined to the lower surface of the support diaphragm 40. The first and second base plates 31 and 32 are sufficiently thicker than the support diaphragm 40, so that the base plate 30 is prevented from warping due to the thermal stress caused by the difference between the thermal expansion coefficient of the base plate 30 and the thermal expansion coefficient of the support diaphragm 40.

The first base plate 31 and the second base plate 32 have an introduction hole 31a and an introduction hole 32a through which a space C2 facing the pressure receiving surface of the diaphragm 12 included in the pressure sensor element 11 communicates with the introduction portion 20V to which a measurement target fluid L flows. In addition, the pressure sensor element 11 is joined to the lower surface of the second base plate 32 via an aluminum oxide-based junction material so that the introduction hole 32a communicates with the space C2. It should be noted here that the pressure sensor element 11 is joined to the second base plate 32 using a well-known method.

[Support Diaphragm 40]

As described above, the support diaphragm 40 is a component provided to bridge the base plate 30 over the casing 20, and includes a thin plate made of Inconel and has a shape that coincides with the shape of the outer circumferential edge of the casing 20, specifically the shapes of the outer circumferential edges of the lower opening end of the upper housing 22 and the upper opening end of the lower housing 21. In the support diaphragm 40, with the first base plate 31 joined to the upper surface thereof and the second base plate 32 joined to the lower surface thereof, the outer circumferential portion (circumferential edge portion) thereof is joined by welding or the like while the outer circumferential portion is sandwiched between the lower opening end of the upper housing 22 and the upper opening end of the lower housing 21. It should be noted here that the thickness of the support diaphragm 40 is, for example, several tens of micrometers in the case of the present embodiment, which is sufficiently thinner than the first and second base plates 31 and 32. In addition, in the central portion of the support diaphragm 40, in addition to the introduction hole 31a and the introduction hole 32a, there is an introduction hole 40a through which the space C2 facing the pressure receiving surface of the diaphragm 12 communicates with the introduction portion 20V to which the measurement target fluid L flows.

[Electrode Lead Portion 50]

The electrode lead portion 50 includes the electrode lead pin 51 and a metal shield 52, and the central portion of the electrode lead pin 51 is embedded in the metal shield 52 via a hermetic seal 53 made of an insulating material such as glass to maintain an airtight state between both end portions of the electrode lead pin 51. One ends of the electrode lead pin 51 and the shield 52 project outward from the upper surface of the cover 23 along the axis core CL so as to be connected to a connector portion 320 included in the cable 300 described later, whereby the output of the pressure sensor 1 is transferred to an amplifier and a signal processing unit disposed in the outside. It should be noted here that the hermetic seal 53 also intervenes between the shield 52 and the cover 23 as described above. In addition, conductive contact springs 55 and 56 are connected to the other end portion of the electrode lead pin 51.

The contact springs 55 and 56 are elastic elements provided so as to prevent effects on the measurement accuracy of the pressure sensor element 11 by absorbing the displacement that occurs when the pressure sensor element 11 is displaced due to a sudden rise in pressure because the measurement target fluid L suddenly flows from the introduction portion 20V (more specifically, when the base plate 30 bridged over the casing 20 through the support diaphragm 40 is displaced and the pressure sensor element 11 supported by the base plate 30 is displaced).

[Housing 100]

The housing 100 is a casing element having a space for accommodating the sensor unit 10 therein and has an outside shape like an octagonal prism as illustrated in FIGS. 1(a) and 1(b) by, for example, bending or joining a thin plate material made of stainless steel. Specifically, the housing 100 is formed as a decahedron including eight side surface portions having rectangular thin plates (side surfaces 100SW of the housing 100 are formed by connecting these eight side surface portions), and a lower surface portion 101 (corresponding to the "lower surface" described in the claims) and an upper surface portion 102 (corresponding to the "upper surface" described in the claims) that have substantially the same form including substantially regular octagonal thin plates. An axis core CL1 of the housing 100 is configured so as to be aligned with, for example, the axis core of the small-diameter cylindrical portion 21b or the axis core CL (the axis core of the pipe from and to which the measurement target fluid flows) of the coupling 200. As a result, the above eight side surface portions are formed as portions each having a side surface parallel to the axis core CL1, and the upper surface portion 102 and the lower surface portion 101 are formed as portions each having a surface (surface parallel to the XY plane) orthogonal to the axis core CL1.

Through-holes are formed in the lower surface portion 101 and the upper surface portion 102 of the housing 100, respectively. For example, a first through-hole 103 through which a junction portion CP (portion formed by joining the small-diameter cylindrical portion 21b to the coupling junction portion 220 described later) between the sensor unit 10 and the coupling 200 passes is formed in the lower surface portion 101 as illustrated in FIG. 1(b), and a second through-hole 104 through which the cable 300 passes is formed in the upper surface portion 102 as illustrated in FIG. 1(a). Both of these two through-holes are formed at positions that include the axis core CL1 inside (positions at which the axis core CL1 passes through).

The housing 100 includes two split housings as illustrated in FIGS. 2(a) and 2(b) so as to cover all directions (up and down direction, left and right direction, and front and rear direction) of the sensor unit 10. The two split housings are, for example, a first split housing 110 and a second split housing 120 that are formed so as to split the housing 100 along a plane (for example, a plane parallel to the XZ plane) parallel to the axis core CL1. In the first split housing 110 and the second split housing 120, the mating surfaces of these housings are formed along the axis core CL1, and the openings surrounded by the mating surfaces (end surfaces 110a and 120a described later) are formed within a surface parallel to the axis core CL1.

[First Split Housing 110]

The first split housing 110 is formed so as to include five side surface portions of the eight side surface portions of the housing 100, a first split lower surface portion 111 that forms a part of the lower surface portion 101, and a first split upper surface portion 112 that forms a part of the upper surface portion 102 (see FIGS. 1(a) and 1(b) and FIGS. 2(a) and 2(b)).

Any of the five side surface portions described above has a thin plate member that is rectangular in side view, adjacent portions are connected to each other, and the end surface 110a of the side surface portion located in the end portion forms a part of the mating surface with respect to the second split housing 120. The mating surface is formed as a surface parallel to the axis core CL1 (surface parallel to the XZ plane), whereby the opening of the first split housing 110 is largely opened in a surface parallel to the axis core CL1 (surface parallel to the XZ plane).

As illustrated in FIG. 2(b), the first split lower surface portion 111 is formed as a portion in which a U-shaped notch recess portion (this notch recess portion is referred to below as a "first split lower surface notch 113") is provided in a substantially regular octagonal thin plate in bottom view. This first split lower surface notch 113 is formed as a space that has an opening end located in a position including one side of the eight sides (specifically, one side facing a second split lower surface portion 121 constituting the second split housing 120 described later) and extends (for example, extends in the +Y direction) toward the center of the first split lower surface portion 111 from the one side. In addition, this first split lower surface notch 113 forms a part of the first through-hole 103 through which the junction portion CP passes. That is, a circumferential edge side wall surface 113*a* that defines the first split lower surface notch 113 forms a part of a wall surface 103*a* of the first through-hole 103 (see FIG. 1(*b*)). Accordingly, the width of the opening end of the first split lower surface notch 113 is set to be larger than the maximum width (maximum diameter) of the junction portion CP.

As illustrated in FIG. 2(*a*), the first split upper surface portion 112 is a hexagonal thin plate member surrounded by five sides of the eight sides that define a regular octagon in plan view and a diagonal line connecting two endpoints, and a U-shaped notch recess portion (referred to below as a "first split upper surface notch 114") is further provided. This first split upper surface notch 114 is formed as a space that has an opening end substantially in the center of the diagonal line and extends from the opening end toward the center portion (for example, extends in the +Y direction). The first split upper surface notch 114 forms a part of the second through-hole 104 through which the cable 300 passes. That is, a circumferential edge side wall surface 114*a* that defines the first split upper surface notch 114 forms a part of a wall surface 104*a* of the second through-hole 104 (see FIG. 1(*a*)). The width of the opening end of the first split upper surface notch 114 is set to be larger than, for example, the maximum width (maximum diameter) of the cable 300 (more specifically, a cable body portion 310 described later).

[Second Split Housing 120]

The second split housing 120 includes three side surface portions of the eight side surface portions of the housing 100, the second split lower surface portion 121 that forms a part of the lower surface portion 101, and a second split upper surface portion 122 that forms a part of the upper surface portion 102 (see FIGS. 1(*a*) and 1(*b*) and FIGS. 2(*a*) and 2(*b*)).

Any of the above three side surface portions includes a thin plate member that is rectangular in side view, adjacent portions are connected to each other, and the end surface 120*a* of the side surface portion located in the end portion forms a part of the mating surface with respect to the first split housing 110. The mating surface is formed along a surface (for example, the XZ plane) parallel to the axis core CL1, whereby the opening portion of the second split housing 120 is largely opened in a surface parallel to the axis core CL1 (surface parallel to the XZ plane).

As illustrated in FIG. 2(*b*), the second split lower surface portion 121 includes a substantially rectangular thin plate formed by four sides having substantially the same length as one side of a regular octagon in bottom view. More specifically, the second split lower surface portion 121 is formed as a convex portion (this convex portion may be referred to below as a "second split lower surface convex portion 123", and the second split lower surface convex portion 123 and the second split lower surface portion 121 represent substantially the same portion in the embodiment) that is substantially rectangular in bottom view and extends (for example, extends in the +Y direction) toward the center portion of the housing 100 from the lower end of the side surface portion located in the middle of the three side surface portions described above. Of the circumferential edge side wall surface that defines the circumferential edge of the second split lower surface convex portion 123 (second split lower surface portion 121), a circumferential edge side wall surface 123*a* facing the first split lower surface notch 113 formed in the first split lower surface portion 111 forms a part of the wall surface 103*a* of the first through-hole 103 through which the junction portion CP passes (see FIG. 1(*b*)). Accordingly, the width (the length in the direction of the X-axis) of the circumferential edge side wall surface 123*a* is set to be larger than the maximum width (maximum diameter) of the junction portion CP.

As illustrated in FIG. 2(*a*), the second split upper surface portion 122 includes a thin plate member in which a U-shaped notch recess portion (referred to below as a "second split upper surface notch 124") is formed in what is obtained by removing one of four equally-divided portions (specifically, four equally-divided portions obtained by two dividing lines parallel to two sets of sides orthogonal to each other of the eight sides forming the regular octagonal shape) from a substantially regular octagonal thin plate in plan view. The second split upper surface notch 124 is a space provided at the intersection of the two dividing lines described above and forms a part of the second through-hole 104 through which the cable 300 passes (see FIG. 1(*a*)). That is, a circumferential edge side wall surface 124*a* that defines the second split upper surface notch 124 forms a part of the wall surface 104*a* of the second through-hole 104. Accordingly, the width of the opening end of the second split upper surface notch 124 is set to be larger than the maximum width (maximum diameter) of the cable 300 (more specifically, the cable body portion 310 described later).

[Coupling 200]

The coupling 200 is a connection element for connecting the pipe from and to which the measurement target fluid flows to the pressure sensor 1 and includes, for example, a coupling body portion 210 and the coupling junction portion 220 that are connected integrally with each other.

The coupling body portion 210 includes a hexagonal cylindrical member, made of stainless steel, that is concentric with the above pipe, and screw threads (female screw) to be screwed with the above pipe are formed on the inner wall surface. In addition, for example, a spanner engages with the outer circumferential wall of the coupling body portion 210 with a substantially regular hexagonal shape (sectional shape) in plan view.

The coupling junction portion 220 is a portion to be joined to the small-diameter cylindrical portion 21*b* of the sensor unit 10, for example, by welding and includes a tabular member in which a passage communicating with the introduction portion 20V is formed. The coupling junction portion 220 joined to the small-diameter cylindrical portion 21*b* forms the junction portion CP, as described above.

[Cable 300]

The cable 300 is a portion for electrically connecting to an amplifier disposed outside the pressure sensor 1 to amplify, for example, an electric signal (for example, an electric signal including a voltage value) output from the sensor unit 10 and includes the cable body portion 310 and the connector 320.

The cable body portion 310 includes a plurality of conductors 310*a* made of a conductive material, a shield member 310*b*, made of a conductive material, that covers the plurality of conductors 310*a*, and a covering material 310*c* made of a non-conductive material. In addition, a connector for connecting to the amplifier is attached to the end of the cable body portion 310.

The connector portion 320 is a portion to be connected to the electrode lead portion 50 provided in the sensor unit and has a terminal to be detachably engaged with the electrode lead portion 50 (more specifically, the electrode lead pin 51). This attaches the cable 300 to the sensor unit 10 so that the cable 300 extends in the direction along the axis core CL1.

<Heater Block 500 and Installation Thereof>

Next, a heater block 500 installed to heat the pressure sensor 1 having the housing 100 will be described. This heater block 500 is made of, for example, a material (such as aluminum alloy) having a large thermal conductivity and is heated to a predetermined temperature through a heating wire. A space 500V for accommodating the pressure sensor 1 is opened inside the heater block 500. This space 500V has a volume large enough to form an air layer A for the entire circumference of the side surface 100SW of the housing 100 for covering the pressure sensor 1, and the opening diameter and the height thereof are set to be larger than the maximum outside dimensions and the height of the housing 100 in plan view.

Figure 4:
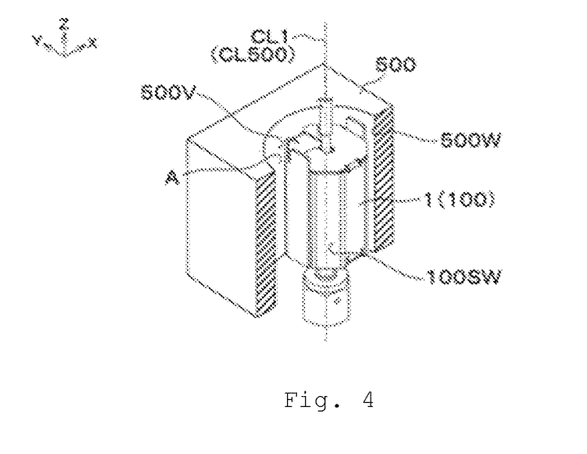
FIG. 4 is a conceptual view (perspective view) illustrating a state in which the pressure sensor with the housing according to the embodiment of the present disclosure is disposed inside a heater block.
Figure 5A:
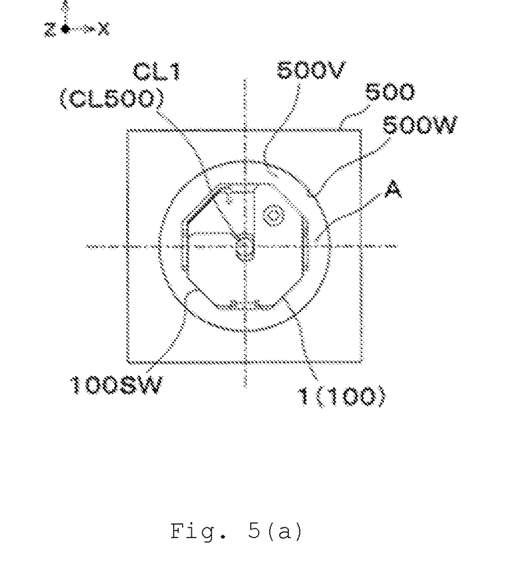

As illustrated in FIGS. 4 and 5(a), the heater block 500 is disposed around the pressure sensor 1 (housing 100) so that the axis core CL1 of the pressure sensor 1 (housing 100) is aligned with an axis core CL500 of the heater block 500. Here, FIG. 4 is a perspective view when only the heater block 500 is cut by the XZ plane, and FIG. 5(a) is a plan view.

As illustrated in FIG. 5(a), when the pressure sensor 1 is correctly disposed at a position at which the axis core CL1 thereof is aligned with the axis core CL500 of the heater block 500 (this corresponds to the "first posture" described in the claims), the air layer A substantially evenly intervenes between the pressure sensor 1 and the heater block 500, more specifically, between the side surface 100SW of the housing 100 of the pressure sensor 1 and an inner circumferential side wall surface 500W of the heater block 500. Accordingly, the inside of the pressure sensor 1 (housing 100) is heated substantially uniformly in this state.

Figure 5B:
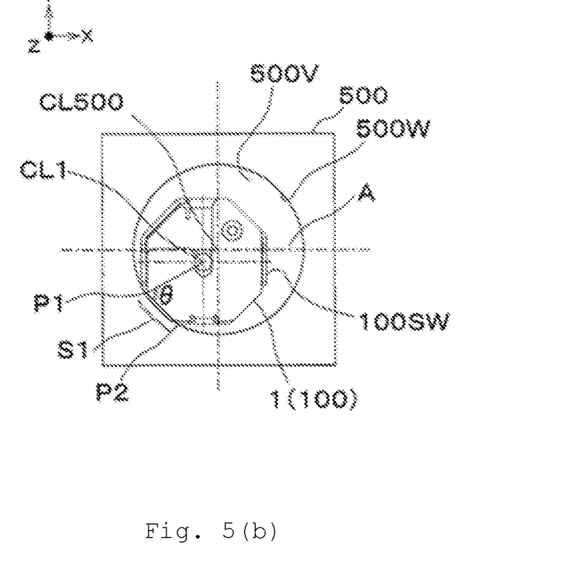

In contrast, when the pressure sensor 1 is disposed in a position (position at which the axis core CL1 is eccentric with the axis core CL500) at which the axis core CL1 thereof is not aligned with the axis core CL500 of the heater block 500 because, for example, the design, manufacture, and installation of the heater block is inappropriate (this corresponds to the "second posture" described in the claims), the pressure sensor 1 may make line contact with the heater block 500 at two positions as illustrated in FIG. 5(b). More specifically, the side surface 100SW of the housing 100 of the pressure sensor 1 may make line contact with the inner circumferential side wall surface 500W of the heater block 500 at two positions, that is, a contact position P1 and a contact position P2 (such a state is referred to below as a "contact state"). In the pressure sensor in the contact state described above, a region in which the air layer A becomes thin is formed. For example, in this embodiment, a region S1 in which the air layer A becomes thin is formed between the first contact portion P1 and the second contact portion P2. In a conventional pressure sensor 1000 with the cylindrical housing illustrated in FIGS. 12 and 13, a region S1000 in which the air layer A becomes thin is formed near a contact portion P1000.

Here, the region S1 in the pressure sensor 1 according to the embodiment is wider than the region S1000 in the conventional pressure sensor 1000 as described later, thereby increasing the volume of the air layer A in the region (see FIGS. 5(b) and 13(b)).

That is, in the pressure sensor 1, which makes contact with the inner circumferential side wall surface (inner circumferential side wall surface 500W of the heater block 500) including a cylindrical surface at a plurality of positions (first contact position P1 and second contact position P2), in plan view, the angle θ formed by the line segment connecting the first contact position P1 and the second contact position P2 adjacent to each other and the line segment connecting the first contact position P1 or the second contact position P2 to the axis core CL1 is less than 90 degrees geometrically (see FIG. 5(b)). In contrast, in the conventional pressure sensor 1000 in which the side surface of the housing including a cylindrical surface with a small curvature radius is inscribed in the inner circumferential side wall surface 500W including a cylindrical surface with a large curvature radius, there is only one contact position (contact position P1000 only) and, in plan view, the angle formed by the line segment connecting the contact position P1000 to the axis core CL1000 and the tangent at the contact position P1000 is 90 degrees (see FIG. 13(b)). Accordingly, near the contact position (contact portion), the outer circumferential edge of the side surface 100SW of the housing 100 formed along the line segment connecting the first contact position P1 to the second contact position P2 is located inside the cylindrical surface inscribed in the inner circumferential side wall surface 500W, that is, inside (on the axis core side) the outer circumferential edge of the side surface of the housing included in the conventional pressure sensor 1000.

Figure 13B:
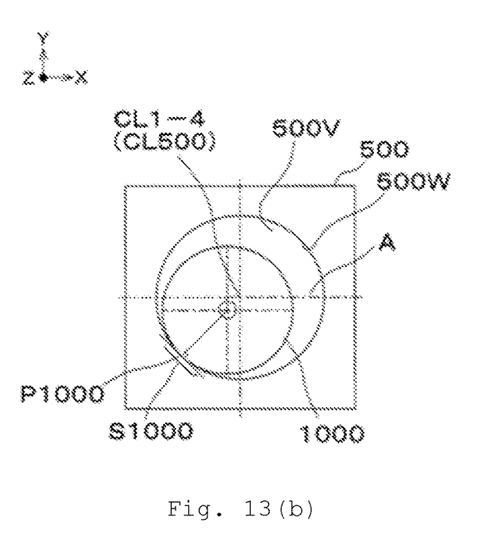

Accordingly, the region S1 in the pressure sensor 1 is wider than the region S1000 of the conventional pressure sensor 1000 (see FIGS. 5(b) and 13(b)).

<Effects>

According to the housing 100 with the above structure and the pressure sensor 1 with the housing 100, the following effects are obtained.

[Effect 1] As described above, in the pressure sensor 1 according to the embodiment in the contact state, the space in which the air layer A near the contact portion is formed, that is, the space formed between the side surface 100SW of the housing 100 and the inner circumferential side wall surface 500W of the heater block 500 can be larger than in the conventional pressure sensor 1000 in the same state. This can suppress the turbulence (unevenness) of the heat flux and the temperature distribution of the inner space of the pressure sensor 1 caused by the turbulence, that is, the temperature distribution of the inside of the housing 100 and the pressure sensor element 11 (sensor unit 10) accommodated in the housing 100, thereby reducing measurement error.

[Effect 2] Since the housing 100 is an octagonal prism, the inner space for accommodating the pressure sensor element (sensor unit 10) is properly obtained and the air layer A near the contact portion in the contact state can be obtained moderately. As a result, both the space utility and the above effect (effect 1) can be achieved at a high level.

[Effect 3] Since the pressure sensor with the cylindrical housing is easy to roll, the pressure sensor may often drop on the floor during installation. In contrast, since the pressure sensor 1 according to the embodiment has the housing 100 like an octagonal prism, the pressure sensor 1 can be prevented from dropping due to rolling. As a result, installation can be performed easily, safely, and reliably, so it is possible to provide a pressure sensor that is easily handled and highly practical.

In addition, when the housing 100 is divided into a plurality of housings, the following effect is obtained.

[Effect 4] By dividing the housing 100 so that mating surfaces are formed along the axis core CL1, variations of the shape of the side surface of the housing 100 can be easily increased (for example, the form of the side surface 100SW (side surface portion) of the housing 100 is partially different). This improves freedom in designing the preferable housing shape to obtain the effect 1 described above.

Furthermore, since the housing 100 is divided in the form described above, the following incidental effect is obtained in addition to the effect of suppressing the temperature distribution.

[Effect 5] A common housing (housing with the same form) can be assembled to subassemblies 400 with a plurality of specifications in which the couplings 200 with different sizes (nominal diameters) are joined to the sensor unit 10 (pressure sensor element 11) so as to support pipes with various sizes. That is, the production cost can be suppressed because the housings with different forms (sizes) do not need to be prepared for the subassemblies 400 with different specifications.

[Effect 6] Since the form (size) of the housing does not depend on the size (nominal diameter) of the coupling, the size of the housing can be suppressed to the minimum (for example, the minimum required size for accommodating the sensor unit 10) and a small pressure sensor can be provided.

[Effect 7] By creating the subassemblies 400 in advance in an intermediate process and storing and managing the subassemblies 400 for each specification as component inventory, the final process of product manufacturing can be configured by a process including only the assembly of the housing and the installation of cables (process that does not include machining such as welding). This can shorten the lead time for manufacturing products.

[Effect 8] In the first split housing 110 and the second split housing 120 that constitute the housing 100, openings are formed so as to be largely opened in a plane (plane parallel to the XZ plane) parallel to the axis core CL1 (axis core CL) since the mating surfaces of the first split housing 110 and the second split housing 120 are formed along the axis core CL1 as described above. Accordingly, the handling work (attachment work) of the cable 300 extending along the axis core CL1 (axis core CL) becomes easy, thereby improving the assembling property. Since the handling of the cable 300 becomes easy, it is possible to take several different assembly process orders, such as the process order in which the cable 300 is attached to the subassembly 400 and then the split housings (first split housing 110 and second split housing) are assembled and the process order in which a part (for example, the first split housing 110) of the split housings is assembled to the subassembly 400 and then the cable 300 is assembled. In the latter case, for example, when the weight of the cable 300 is large, since the cable 300 can be attached using the circumferential edge side wall surface 114a of the first split upper surface notch 114 that forms the wall surface of the second through-hole 104 as a support surface, an excessive load can be prevented from being applied to the connection terminal close to the sensor unit 10. Since this embodiment improves the freedom in the assembly process order as described above, an efficient assembly process order can be taken as appropriate according to the situation. Furthermore, even when the connector to be connected to the amplifier disposed in the end portion of the cable 300 has, for example, outside dimensions larger than the opening dimensions of the second through-hole 104 and is integrally joined to the cable body portion 310, attachment can be performed easily without changing the form of the housing and/or changing the process order.

<Modification>

Figure 6:
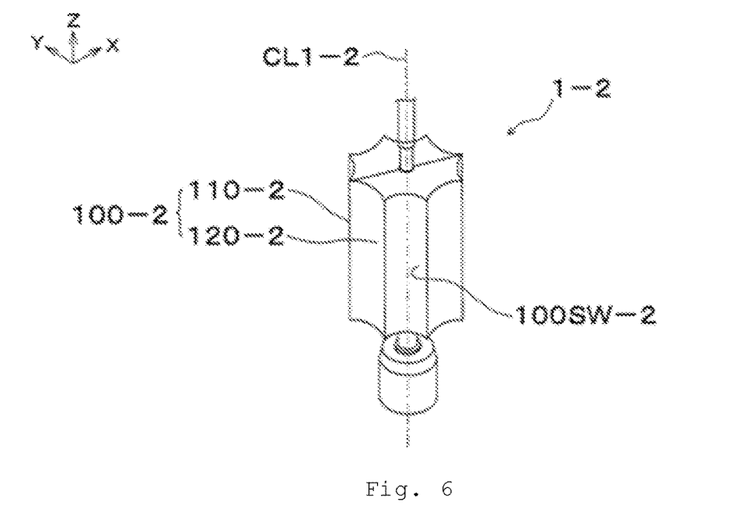
FIG. 6 is a perspective view illustrating a pressure sensor with a housing (modification 1) according to the embodiment of the present disclosure when viewed from diagonally above.

As a modification of the embodiment described above, the side surface 100SW of the housing 100 may be formed as a curved surface instead of a flat surface. For example, in the embodiment described above, the side surface 100SW is formed by connecting eight planes so as to form a regular octagon in plan view, but the side surface may be formed by eight curved surfaces. Specifically, as illustrated in FIG. 6, eight curved surfaces may be formed as parts of a cylindrical surface that is parallel to the axis core CL1 and recessed toward the axis core CL1 (the curvature center is a part of the cylindrical surface disposed outside the housing 100) and these curved surfaces may be connected to form a side surface 100SW-2 of a housing 100-2. This housing 100-2 includes, for example, a pair of split housings (first split housing 110-2 and second split housing 120-2) that have a symmetric shape.

Figure 7A:
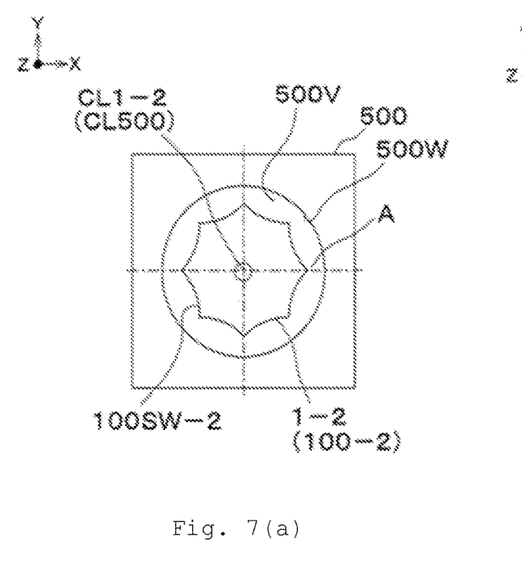
Figure 7B:
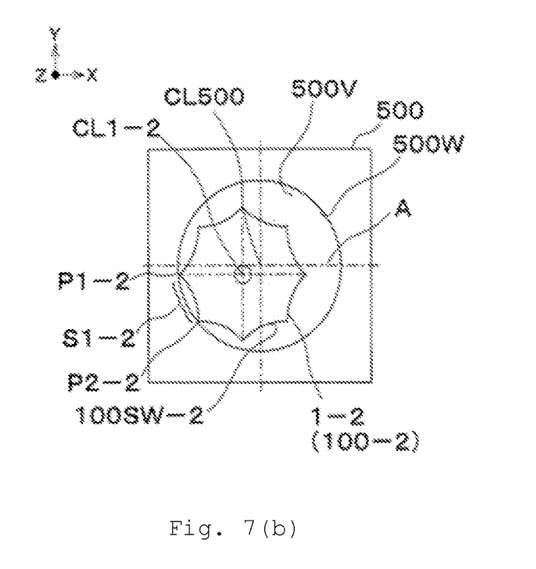

FIG. 7 is a plan view illustrating the state in which the heater block 500 is disposed around the housing 100-2 and a pressure sensor 1-2 with the housing 100-2. FIG. 7(a) is a plan view illustrating the pressure sensor 1-2 disposed correctly at a position at which an axis core CL1-2 thereof is aligned with the axis core CL500 of the heater block 500, and FIG. 7(b) is a plan view illustrating the pressure sensor 1-2 in the contact state.

In the housing 100-2 according to modification 1 and the pressure sensor 1-2 with the housing 100-2, a region S1-2 (region between a first contact position P1-2 and a second contact position P2-2) in which the air layer A in the contact state is formed can be wider than the region S1 in the housing 100 according to the embodiment described above and the pressure sensor 1 with the housing 100 (see FIGS. 5(b) and 7(b)). Accordingly, the effect of suppressing the occurrence of temperature distribution (effect 1) is more outstanding.

Figure 8:
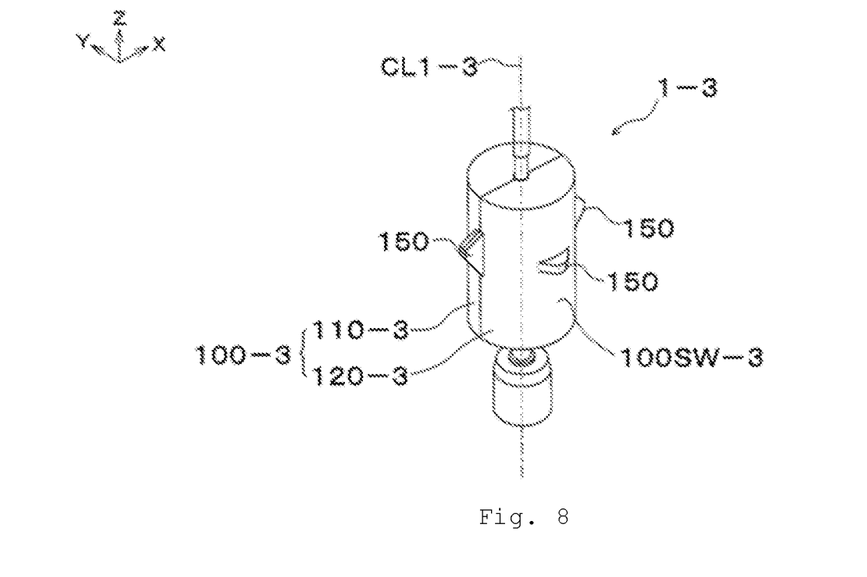
FIG. 8 is a perspective view illustrating a pressure sensor with a housing (modification 2) according to the embodiment of the present disclosure when viewed from diagonally above.

In addition, as another modification (modification 2), for example, as illustrated in FIGS. 8 and 9, a plurality of convex portions 150 may be provided on a side surface 100SW-3 of a housing 100-3 having a cylindrical shape as the basic form thereof. In modification 2, four convex portions 150 project at intervals of substantially 90 degrees in plan view on the cylindrical side surface 100SW-3. The positions and the specific form of the convex portions 150 are not limited to specific ones and may have a different form in each place. Furthermore, the method of forming the convex portions 150 is also not limited to a specific one. For example, projecting pieces having a predetermined shape may be joined to the side surface 100SW-3 of the housing 100-3 by welding or an adhesive, or the convex portions 150 may be integrally formed by applying machining such as pressing to a member forming the housing 100-3 (side surface 100SW-3). When the housing 100-3 includes a plurality of split housings (first split housing 110-3 and second split housing 120-3), the convex portions 150 may be formed along the edges of the split housings. Furthermore, the convex portions 150 may be made of a material having a small thermal conductivity, or a material having a small thermal conductivity may be attached only to the surface portions of the convex portions 150 in contact with the inner circumferential side wall surface 500W of the heater block 500.

Figure 9A:
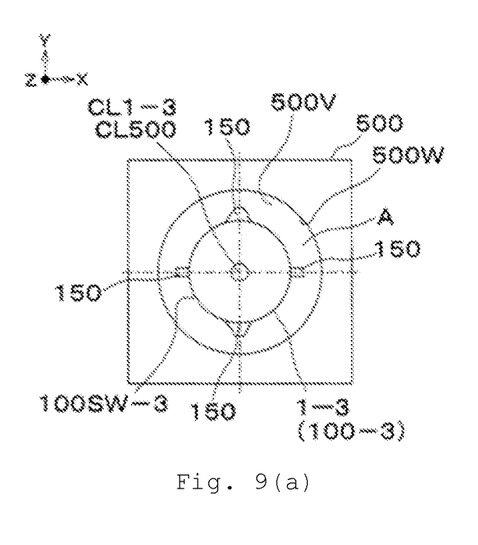
Figure 9B:
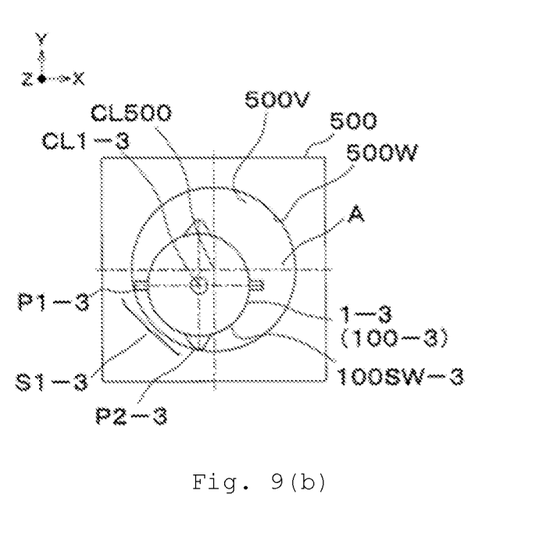

FIG. 9 is a plan view illustrating the state in which the heater block 500 is disposed around the housing 100-3 and the pressure sensor 1-3 with the housing 100-3. FIG. 9(a) is a plan view illustrating the pressure sensor 1-3 disposed correctly at the position at which the axis core CL1-3 thereof is aligned with axis core CL500 of the heater block 500, and FIG. 9(b) is a plan view illustrating the pressure sensor 1-3 in the contact state.

According to the housing 100-3 according to modification 2 and the pressure sensor 1-3 with the housing 100-3, the region S1-3 in which the air layer A is formed in the contact state can be wider than the region S1 in the housing 100 according to the embodiment described above and the pressure sensor 1 with the housing 100 (see FIGS. 5(b) and 9(b)). Accordingly, the effect (effect 1) of suppressing the occurrence of temperature distribution is more outstanding.

In addition, in the specification in which the convex portions 150 are made of a material having a small thermal conductivity and a material having a small thermal conductivity is pasted onto the surface thereof, for example, it is possible to suppress local heat transfer through a first contact position P1-3 and a second contact position P2-3 in contact with the inner circumferential side wall surface 500W of the heater block 500. The effect (effect 1) of suppressing the occurrence of temperature distribution is also obtained from this point of view.

Figure 10:
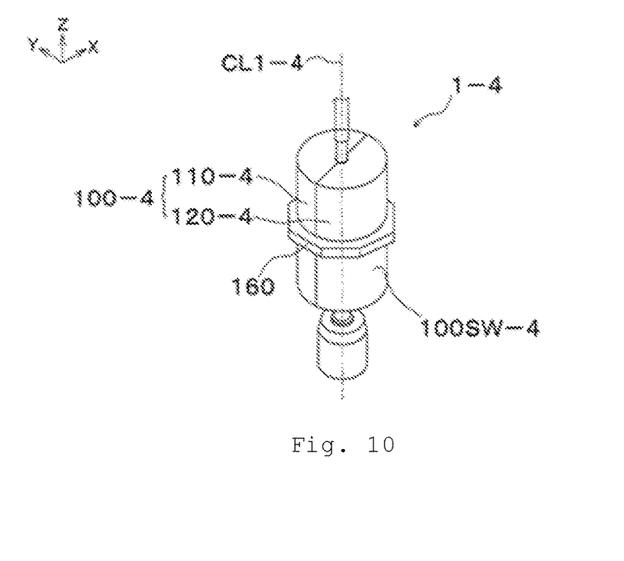
FIG. 10 is a perspective view illustrating a pressure sensor with a housing (modification 3) according to the embodiment of the present disclosure when viewed from diagonally above.

Furthermore, as another modification (modification 3), a convex portion may be formed on a side surface 100SW-4 of a housing 100-4 so that the cylindrical housing 100-4 is covered with an annular member 160, as illustrated in, for example, FIGS. 10 and 11. In modification 3, a convex portion 160 like a thin plate with an octagonal shape in plan view will be formed on the cylindrical side surface 100SW-4. The position and specific form of the annular member 160 are not limited to specific ones, and a plurality of annular members 160 may be disposed. Furthermore, the material of the annular member 160 may be made of a material with a small thermal conductivity, or a material with a small thermal conductivity may be, for example, pasted only onto the surface portion in contact with the inner circumferential side wall surface 500W of the heater block 500. In addition, when the housing 100-3 includes a plurality of split housings (first split housing 110-4 and second split housing 120-4), the annular member 160 may be used as a functional member that connects these two split housings to each other.

Figure 11A:
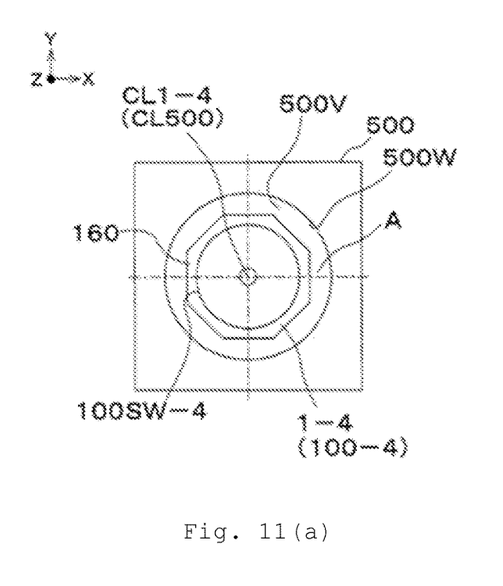
Figure 11B:
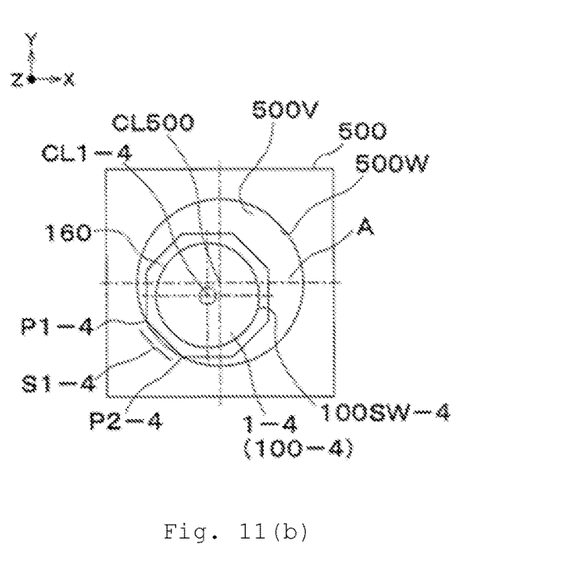

FIG. 11 is a plan view illustrating the state in which the heater block 500 is disposed around the housing 100-4 and the pressure sensor 1-4 with the housing 100-4. FIG. 11(a) is a plan view illustrating the pressure sensor 1-4 disposed correctly at the position at which an axis core CL1-4 thereof is aligned with an axis core CL500 of the heater block 500, and FIG. 11(b) is a plan view illustrating the pressure sensor 1-4 in the contact state.

In the housing 100-4 according to modification 3 and the pressure sensor 1-4 with the housing 100-4, the space in which the air layer A in the contact state is formed can be larger than the region S1 in the housing 100 according to the embodiment described above and the pressure sensor 1 with the housing 100. That is, since the annular member 160 is disposed only in a part in the up and down direction (Z-axis direction) along the axis core CL1-4 of the housing 100-4, the outside dimensions (the dimension of outline projected onto the XY plane) in plan view of the portion in which the annual member 160 is not disposed are smaller than that of the annual member 160. Accordingly, the space in which the air layer A in the contact state is formed can be larger. Accordingly, the effect of suppressing the occurrence of temperature distribution (effect 1) is more outstanding.

In addition, in the specification in which the annular member 160 is made of a material having a small thermal conductivity, or a material having a small thermal conductivity is, for example, pasted onto the surface thereof, it is possible to suppress local heat transfer through a first contact position P1-4 and a second contact position P2-4 in contact with the inner circumferential side wall surface 500W of the heater block 500. The effect (effect 1) of suppressing the occurrence of temperature distribution is also obtained from this point of view.

Preferred embodiments of the present disclosure have been described above, but the present disclosure is not limited to the embodiments, and various changes can be made without departing from the spirit of the disclosure. In addition, structures not directly described in the specification and the drawings also fall within the scope of the technical concept of the present disclosure as long as the operation and effect of the present disclosure are obtained. Furthermore, the examples in the above description and the drawings can be combined with each other as long as there is no contradiction in the purposes and structures of the examples.

For example, in the pressure sensor 1 according to the above embodiment (and modifications 1 to 3 thereof), the side surface of the housing 100 (100-2, 100-3, 100-4) is a prismatic body extending along the axis core CL1 (CL1-2, CL1-3, CL1-4) in the basic form thereof, but the basic form may be a truncated pyramid or the like.

In addition, the pressure sensor 1 with the housing 100 has been described as the capacitive pressure sensor element 11 (sensor unit 10) in the above embodiment, but the present disclosure is not limited to this specification. The pressure sensor 1 may be any pressure sensor element and any pressure sensor with the pressure sensor element that adopt a sensing system that detects the deformation of a diaphragm as an electric signal, such as, for example, a semiconductor piezoresistive type and a strain gauge type for which a resistance gauge is formed as a film by attachment or sputtering.

DESCRIPTION OF REFERENCE NUMERALS AND SIGNS 1, 1-2, 1-3, 1-4: pressure sensor, 10: sensor unit, 11: pressure sensor element, 21b: small-diameter cylindrical portion, 50: electrode lead portion, 100, 100-2, 100-3, 100-4: housing, 100SW, 100SW-2, 100SW-3, 100SW-4: side surface, 101: lower surface portion, 102: upper surface portion, 103: first through-hole, 103a: wall surface, 104: second through-hole, 104a: wall surface, 110: first split housing, 110a: end surface, 120a: end surface, 111: first split lower surface portion, 112: first split upper surface portion, 113: first split lower surface notch, 113a: circumferential edge side wall surface, 114: first split upper surface notch, 114a: circumferential edge side wall surface, 120: second split housing, 121: second split lower surface portion, 122: second split upper surface portion, 123: second split lower surface convex portion, 123a: circumferential edge side wall surface, 124: second split upper surface notch, 124a: circumferential edge side wall surface, 150: convex portion, 160: annular member, 200: coupling, 210: coupling body portion, 220: coupling junction portion, 300: cable, 310: cable body portion, 320: connector portion, 400: subassembly, 500: heater block, CP: junction portion, A: air layer, CL, CL1, CL1-2, CL1-3, CL1-4: axis core, S1, S1-2, S1-3, S1-4: region, P1, P1-2, P1-3, P1-4: first contact position, P2, P2-2, P2-3, P2-4: second contact position

The invention claimed is:
1. A pressure sensor system comprising:
a pressure sensor housing comprising a hollow member including a cylindrical side surface extending along a predetermined axis core, an upper surface connected to the side surface, and a lower surface connected to the side surface;
a pressure sensor element accommodated inside the hollow member, the pressure sensor element configured to detect a pressure of a fluid; and a heater block with a cylindrical space inside, the cylindrical space having an axis core and accommodating the hollow member;

wherein an entire circumference of the side surface of the hollow member is surrounded by an air layer in a first posture in which the axis core of the cylindrical space is aligned with the predetermined axis core of the hollow member, and the side surface of the hollow member is in contact with a wall surface defining the cylindrical space at a plurality of points at the same time in a second posture, the second posture being at least one of postures in which the predetermined axis core of the hollow member is eccentric with the axis core of the cylindrical space.

2. The pressure sensor system according to claim 1, wherein at least a part of the side surface of the hollow member is formed so that a shape formed by an intersection line between the side surface and a plane orthogonal to the predetermined axis core is a polygon.

3. The pressure sensor system according to claim 2, wherein the side surface of the hollow member is formed by connecting three or more planes parallel to the predetermined axis core.

4. The pressure sensor system according to claim 3, wherein the polygon is an octagon.

5. The pressure sensor system according to claim 4, wherein a convex portion is provided on the side surface of the hollow member.

6. The pressure sensor system according to claim 3, wherein a convex portion is provided on the side surface of the hollow member.

7. The pressure sensor system according to claim 2, wherein the polygon is an octagon.

8. The pressure sensor system according to claim 7, wherein a convex portion is provided on the side surface of the hollow member.

9. The pressure sensor system according to claim 2, wherein a convex portion is provided on the side surface of the hollow member.

10. The pressure sensor system according to claim 1, wherein at least a part of the side surface of the hollow member is formed so that a shape formed by an intersection line between the side surface and a plane orthogonal to the predetermined axis core is a shape obtained by connecting three or more different curved lines, and at least one of a curvature and a curvature center is different among the different curved lines.

11. The pressure sensor system according to claim 10, wherein the side surface of the hollow member is a part of a cylindrical surface that extends in parallel to the predetermined axis core and is recessed toward the predetermined axis core.

12. The pressure sensor system according to claim 11, wherein a convex portion is provided on the side surface of the hollow member.

13. The pressure sensor system according to claim 10, wherein a convex portion is provided on the side surface of the hollow member.

14. The pressure sensor system according to claim 1, wherein a convex portion is provided on the side surface of the hollow member.

* * * * *